INVENTOR
EDWARD L. KRIEGER

BY Griffin and Stokes

ATTORNEYS 3,212,064

MATRIX HAVING THIN MAGNETIC FILM LOGICAL GATES FOR TRANSFERRING SIGNALS FROM PLURAL INPUT MEANS TO PLURAL OUTPUT MEANS

Edward L. Krieger, St. Paul, Minn., assignor to Sperry Rand Corporation, New York, N.Y., a corporation of Delaware Filed Nov. 27, 1961, Ser. No. 155,100
23 Claims. (Cl. 340—172.5)

The present invention relates to a transfer matrix for communicating between registers, and more particularly, to one comprised of magnetic thin film logical gates.

The transfer matrix comprising the present invention is here defined to be an arrangement of gating circuits for transferring information in random order from one of a plurality of registers to another of the same or a different plurality of registers. The principles herein disclosed may be applied in devising transfer matrices for many different kinds of data processing systems wherein is desired the random selection and transfer at high speed of one of a plurality of data words, or a portion of a data word, to any one of a number of outgoing channels. Thus, the advantage of the system lies in its flexibility of communication between input and output registers, coupled with an extremely rapid transfer time.

It is accordingly an object of the present invention to provide a high speed transfer matrix for transferring information from any selected input register or the like to any output register, where the selection is completely random and need follow no predetermined sequence.

Another object of the present invention is to provide an arrangement of thin magnetic films of the uniaxial anisotropic type having a single preferred axis of magnetization along which lies the remanent magnetization, for responding to a transfer pulse to gate the contents of a register, or a portion thereof, to a specific output channel.

Yet another object of the present invention is to provide a transfer matrix comprised of thin magnetic films of the uniaxial anisotropic type for allowing any register of a single set of registers to communicate with any other register of the same set.

These and other objects of the present invention will become apparent during the course of the following description, which should be read in conjunction with the drawings in which:

FIGURE 4 is vector diagram illustrating the operation of the logical gate of FIGURE 3;

FIGURE 6 is vector diagram illustrating the operation of the gate in FIGURE 5;

Figure 7:
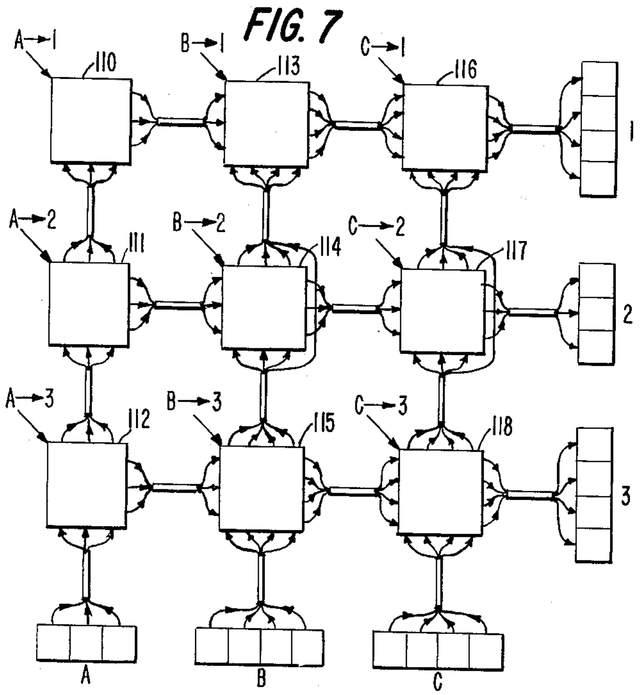
Figure 7A:
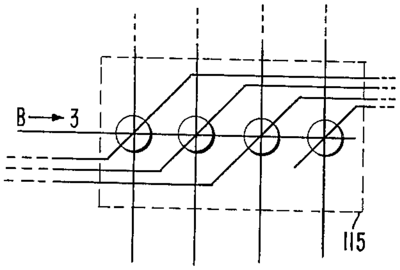
Figure 8:
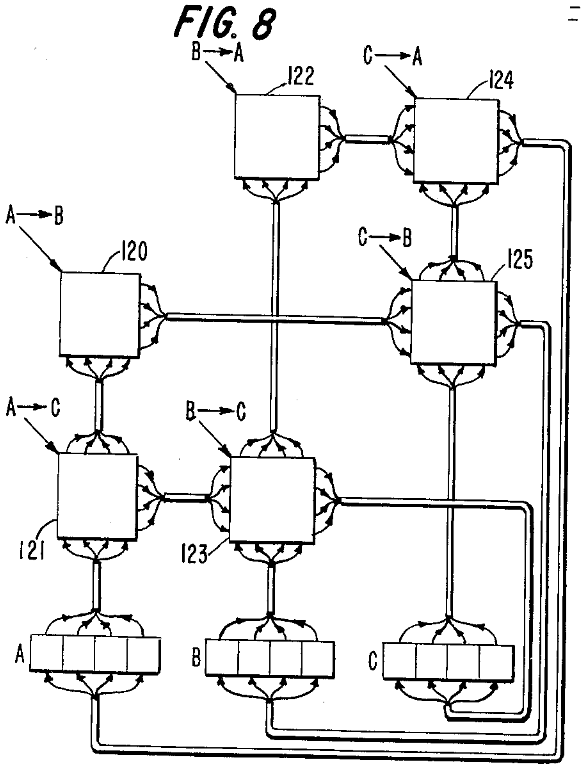

FIGURES 7 and 7*a* are simplified block diagrams showing the configuration of another transfer matrix constructed according to the principles of the present invention; and FIGURE 8 is a simplified block diagram showing the configuration of a third transfer matrix constructed according to the principles of the present invention.

Figure 1:
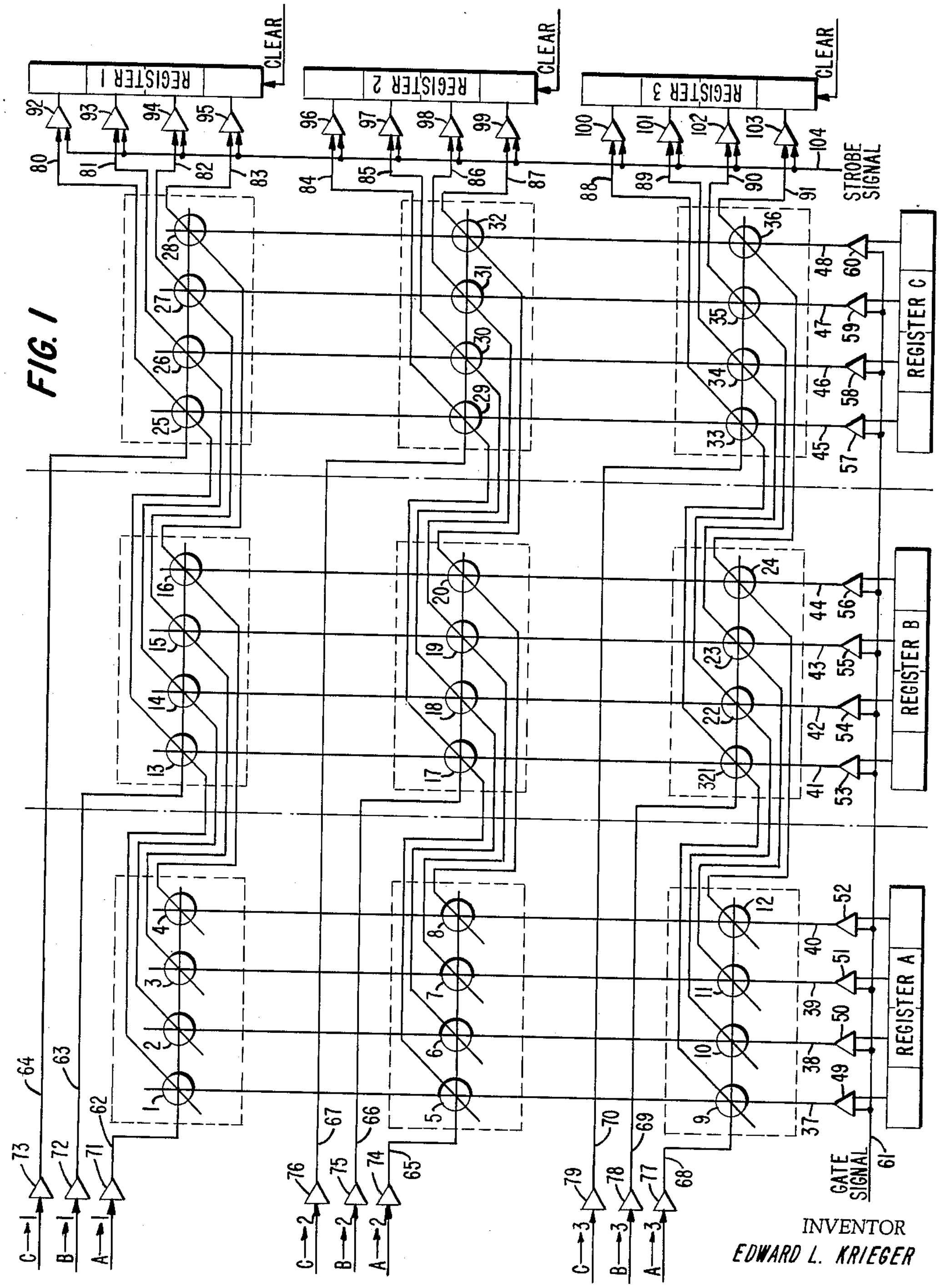
FIGURE 1 is a block diagram of one embodiment of the invention showing a square matrix for communicating between two equal groups of registers.

FIGURE 1 is a block diagram of a thin film transfer matrix constructed in accordance with the principles of this invention. Any one of a group of input registers A, B, or C may have stored therein information which must be transferred to any one of a group of output registers 1, 2, or 3. For purposes of this description, each input and output register provides storage for four binary bits which, when taken together, comprise a binary word. In this matrix, the information bits of a binary word are transferred in parallel, i.e., simultaneously, in order to reduce the word transfer time between input and output registers. In addition, this transfer time is substantially reduced by the use of a thin magnetic film logical gate, a plurality of which, numbered 1 through 36, are arranged as the transfer matrix. This array of thin magnetic film gates is essentially divided into three (or any other number N greater than 1) sets each respectively comprised of gates 1 through 12, 13 through 24, and 25 through 36, where each set is individually associated with the respective registers A, B, and C. Within any *n*th set, the gates are divided into three (or any other number M greater than 1) groups each comprised of four gates. The actual number of gates in each *m*th group of each *n*th set may vary from the number in other groups of the same set or other sets, according to the set and group location as will be evident in FIGURE 7 subsequently to be described. This possibility of variation in the number of gates in different groups can be conveniently expressed by the symbol $K_{nm}$, with the symbol K representing the special case where every group in the matrix contains the same number of gates. For example, in the set of gates associated with register A, in FIGURE 1 gates 1 through 4, 5 through 8, and 9 through 12 form three groups therein. In like fashion, gates 13 through 16 and 25 through 28 each comprise a group in the sets respectively associated with the registers B and C.

Each thin film gate in FIGURE 1 is diagrammatically represented by a circle and includes a digit winding, a transfer winding, and a sense winding, which are respectively represented by the vertical, horizontal, and diagonal lines which cross at the center of the circle. Within each *n*th set of gates, the digit windings of a single *k*th gate in each of the three groups are connected in series circuit with one another and with a digit conductor associated with a single *k*th storage bit location of the associated input register. For example, in the set of gates associated with register A, the digit windings of gates 1, 5, and 9 are connected in series circuit with one another and with a digit conductor 37. Likewise, the digit windings of gates 2, 6, and 10 are in series circuit with a digit conductor 38. Digit conductors 37 through 48 are provided each being individually connected in common with the digit windings of three gates in a set, with each of these gates being in a different group within the set. If every group of every set contains the same number K of gates (as is the case in FIGURE 1 where each $K_{nm}=4$), then there are the same number K of digit conductors for each set. Where, however, there are one or more groups in a set having more gates than are found in any group of another set, then the number of digit conductors varies from set to set. Thus, it may be said that the number of digit conductors for each *n*th set is equal to the number of gates contained in the largest group of said *n*th set. This statement is best illustrated in FIGURE 7 subsequently to be described. Signals are provided on these digit conductors by means of a series of digit drivers 49 through 60 respectively connected thereto. In turn, each of these digit drivers samples the binary content of a register stage said content being gated through the digit driver upon appearance of a gate signal on conductor 61 common to all of the digit drivers.

The transfer windings of the gates comprising a group are also connected in series circuit with one another and with a transfer conductor individual thereto. For example, in the top most group of the left most set shown in FIGURE 1, the transfer windings of gates 1 through 4 are connected in series with a transfer conductor 62. Similarly, gates 5 through 8 of another group in this same set have their transfer windings in series circuit with the digit conductor 65. Since each group of gates in the matrix requires a transfer conductor individual thereto, it is therefore seen that nine ($M \cdot N = 3 \cdot 3 = 9$) transfer conductors 62 through 70 are provided in the matrix of FIGURE 1. A transfer signal on one of these conductors is in turn derived from a series of transfer drivers 71 through 79, any one of which may be randomly energized by an appropriate input signal thereto. The alphanumeric designation at the input to each of the transfer drivers indicates the transfer function of the associated transfer conductor. As an example, the input signal A To 1 applied to transfer driver 71 energizes same to produce a signal on conductor 62 which effects a transfer of the binary bit information in register A to register 1. This operation will be amplified in the following paragraphs.

The sense winding of each thin magnetic film gate is connected in series circuit with the sense windings of a single *k*th gate of but one group in each of several sets. For example, the sense windings of gates 1, 13, and 25 are connected in series circuit with one another and with a sense conductor 80. Each of these gates is in a different set but is associated with the same binary order position of its associated input register. In similar fashion, gates 2, 14, and 26 have their sense windings in a series with a sense conductor 81, where these gates are further associated with the digit conductors connected to the same binary order stage of their respective input registers. A plurality of sense conductors 80 through 91 are provided as shown, each of which is individually connected in series with the sense windings of three gates in the array, with each of its associated gates also being associated with a different one of the input registers by virtue of the digit conductor. The sense conductors are further connected to respective inputs of series implifiers 92 through 103 which in turn are strobed by a signal applied to the common conductor 104. Upon appearance of the strobe signal, a significant signal appearing on any one of the sense conductors is allowed to pass through its associated sense amplifier to set a stage of the output register or registers to which the information is being transferred.

Figure 2:
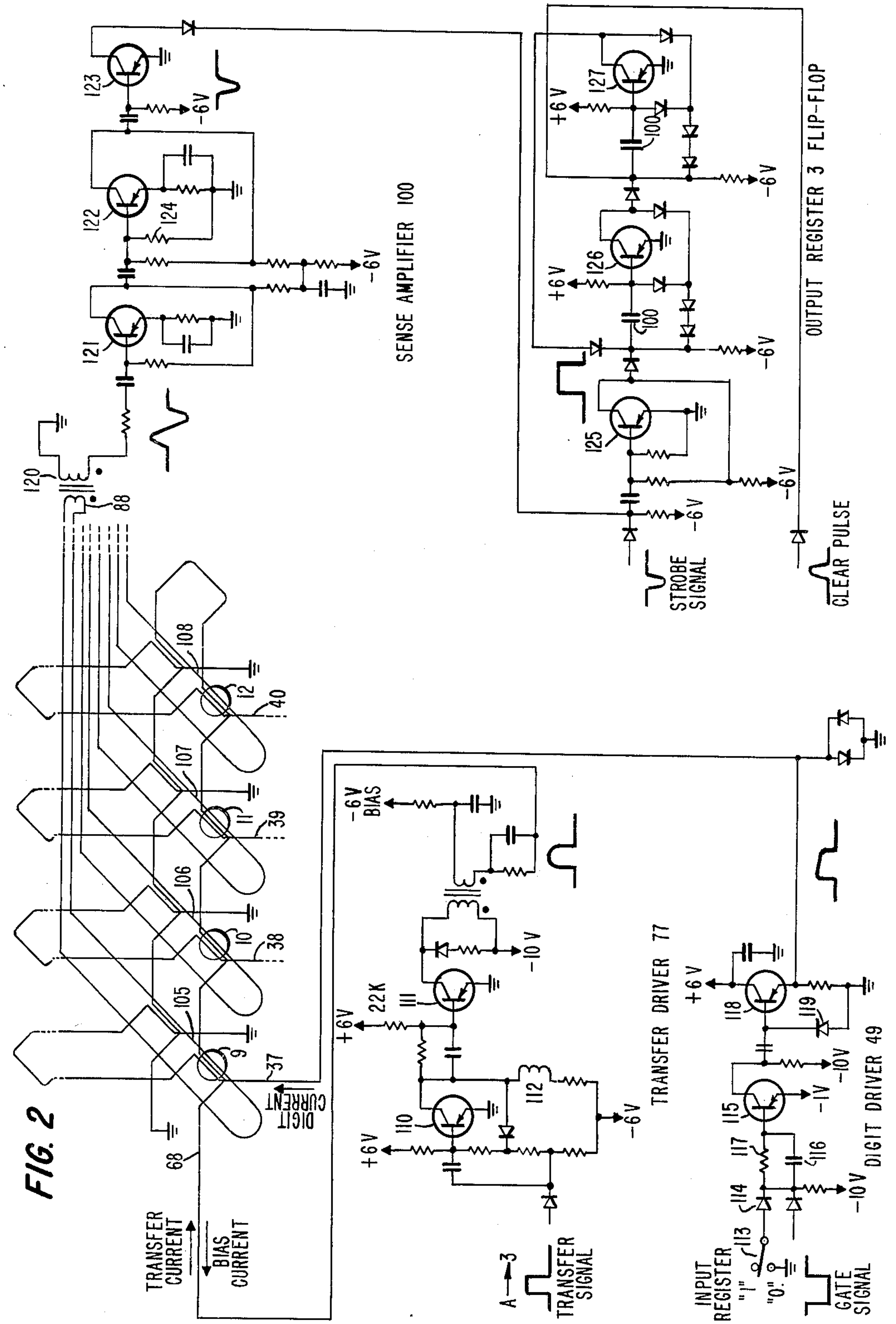
FIGURE 2 is a detailed circuit diagram showing the construction of FIGURE 1.

FIGURE 2 shows details of certain portions of FIGURE 1 as regards the structure of the digit and transfer drivers and sense amplifiers, as well as showing the orientation and arrangement of the three windings for a thin film gate. Only gates 9, 10, 11, and 12 are shown in FIGURE 2 since the detailed structure here is duplicated for the remaining gates in the array of FIGURE 1. As may be seen, the digit, transfer, and sense windings of a gate are all parallel to one another in the vicinity of the thin magnetic film. The series circuit, of which the digit winding of gate 9 forms a part, is connected by means of digit conductor 37 to the output of digit driver 49 and further has a return path to ground. Likewise, the series circuit comprised of the transfer windings of gates 9 through 12 is connected by transfer conductor 68 to the output of transfer driver 77 and also has a return path to ground. The series circuit, of which the sense winding of gate 9 forms part, is coupled by means of sense conductor 88 and the transformer to the sense amplifier 100, with this series circuit also having a return path so as to form a closed loop.

The digit and transfer series circuits are designed to provide zero net inductive coupling to the sense series circuit. For example, the digit series circuit associated with gate 9 is formed so that two portions thereof are parallel to sense winding 105, while two other portions thereof are perpendicular to the sense series circuit return path. When current flows in this digit series circuit, the current in each of the two parallel portions of the circuit induces equal voltages of opposite polarity on sense winding 105 due to the fact that the digit series circuit and return path described a loop as shown. Therefore, current flow in the digit series circuit provides zero net inductive coupling to the sense winding. Current flow in the digit series circuit portions which are at right angles to the return path of the sense series circuit cannot induce a voltage in this circuit. In similar fashion, current flow in the transfer series circuit causes equal voltages of opposite polarity to be induced in sense winding 105 because of the two portions of the transfer series circuit which are parallel to the sense winding. One of these portions, of course, is the transfer winding of the gate. Therefore, the only way in which a net voltage may be induced into sense winding 105 is by a change in the external field due to a change in the magnetization of the thin magnetic film itself. This operation is subsequently described.

In fabricating the transfer matrix, three separate etched circuit layers superimposed one upon the other may be utilized for the central portion of the array. Thus, one layer may comprise the digit windings of the gates connected together in a series circuit, while the second and third layers may respectively comprise the transfer windings in series circuit and the sense windings in series circuit.

Figures 3, 4A, 4B, 5, 6A, 6B:
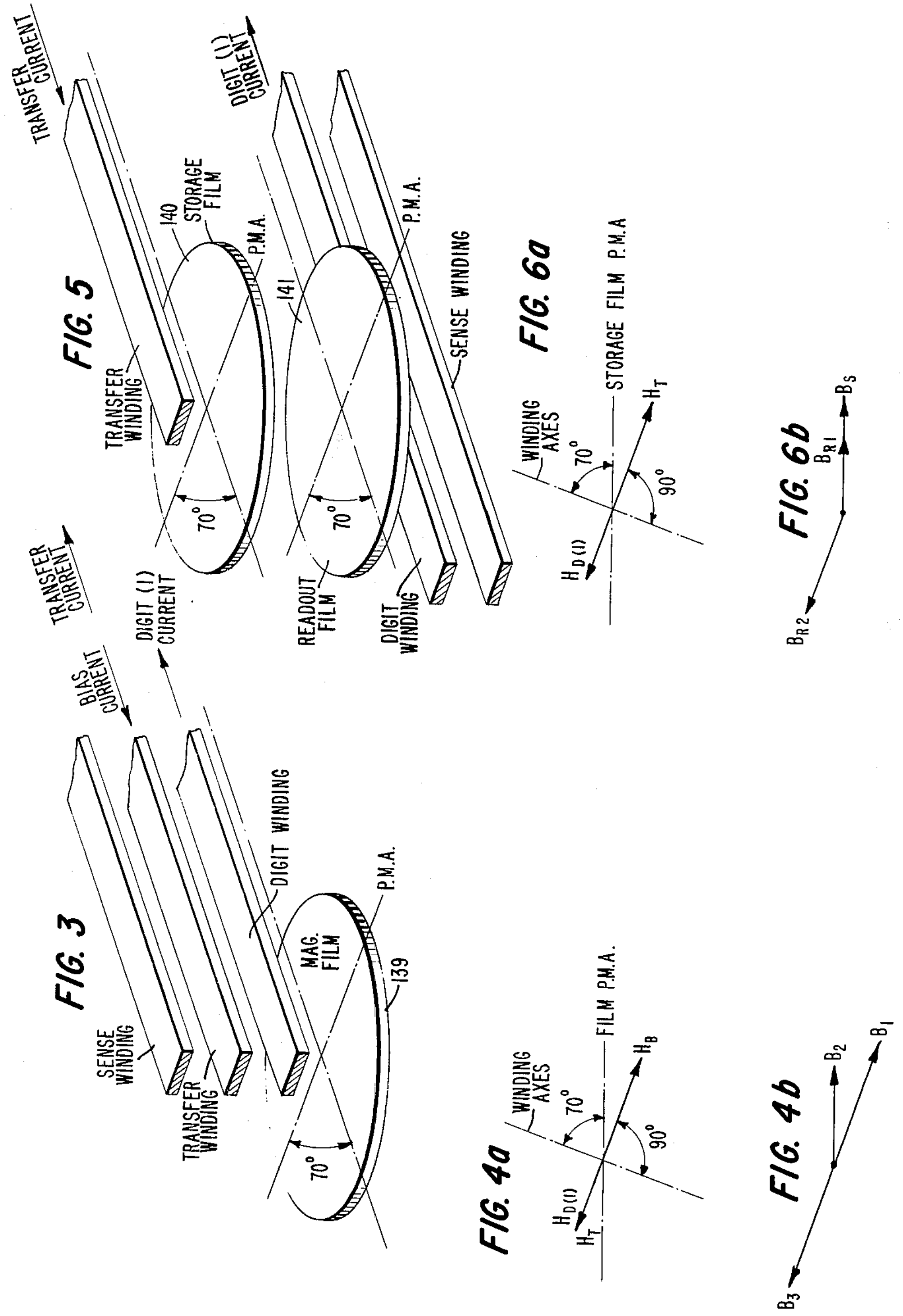
FIGURE 3 is an exploded view of one kind of thin magnetic film logical gate which may be used in the matrix of the present invention.
FIGURE 5 is an exploded view of another kind of thin film logical gate which may be used in the present invention.

FIGURE 2 also shows circuit details for transfer driver 77, digit driver 49, sense amplifier 100, and one stage of the output register 3. The other transfer and digit drivers, sense amplifiers, and register stages shown in FIGURE 1 are constructed in similar fashion. Transfer driver 77 uses two PNP transistors 110 and 111 in the grounded-emitter configuration. Under the no input pulse conditions, the first transistor 110 is biased on to hold the second transistor 111 off. Current from the collector of 110 and the base-bias network of transistor 111 passes through inductor 112 to the negative supply voltage. When an input pulse designated as A To 3 is applied to the base of 110, this transistor is turned off but the current in the inductor cannot decay immediately. Current equal to the first transistor collector current must therefore be drawn from the base of transistor 111 and its bias network. The change in current through the bias network equals the change in base voltage divided by the resistance from the base to the positive supply. Any current in excess must come from the base. This condition fixes the base drive at a constant current during the rise of a pulse. The turning off of transistor 110 thereby turns transistor 111 on. The collector current of transistor 111 is fixed by the low resistance and the collector supply voltage. One may therefore adjust the current gain by adjusting the inductor current, and thereby adjust the band width of the second stage to give the required rise time. The time constant of the inductor and the circuit resistance must be short enough so that steady state operations can be reached during the pulse length; otherwise the current gain and hence the rise time will be pulse rate sensitive. The output pulse is coupled to the load by a step down transformer to give a current gain of two (at low duty factor) over the transistor collector current. When the magnetic thin film logical gate shown in FIGURE 3 is utilized in the array, then a bias current must also be fed into the transfer line. This bias current is generated by a negative voltage connected at the bottom of the transformer secondary such that the bias current has a polarity opposite to that of the transfer current generated at the time that the transfer signal A To 3 is applied to the transfer driver. On the other hand, if the logical gate of FIGURE 5 is used in the transfer matrix array, then no bias current is required during the quiescent condition of the driver.

For purposes of this description, the input register stages associated with digit driver 49 is considered to consist of a terminal switch 113 and diode 114. When the register stage holds a binary 0, the input to the digit transfer driver is clamped at near ground, rendering the negative input gate signal ineffective so that no positive output current is produced in the digit conductor. During the absence of the input gate signal, the input to the driver is clamped through a voltage which is no more negative than the voltage applied to the emitter of transistor 115. The clamping thereby holds transistor 115 off because its base is not more negative than the emitter. The negative input gate signal thereupon allows 115 to turn on. The parallel capacitor 116 and base resistor 117 provide a pulse peaking circuit. The output transistor 118 is connected as an emitter follower, whereupon under no pulse conditions it is biased off. The diode 119 in the base circuit of 118 clamps the negative portion of the input pulse to ground and prevents a D.C. level shift with duty cycle.

Any output voltage induced on sense winding 105 of gate 9 is transmitted via sense conductor 88 to the primary of pulse transformer 120. The transformer output is fed into a sense amplifier consisting of the initial three transistor stages 121, 122, and 123. The first two stages of the sense amplifier are linear amplifiers with self bias and emitter degeneration to decrease the rise time and improve stability. A threshold may be set at the second stage by means of resistor 124 to eliminate noise pulses up to a certain level. The final stage 123 produces a negative output pulse which is coupled to a strobe gate to which is also coupled a strobe signal for sampling the peak voltage of the amplified induced signal on the sense conductor. The output from transistor 125 is thereupon applied to the appropriate stage of output register 3 which can consist of transistors 126 and 127 connected in flip-flop fashion. Means also are provided to supply each stage of the register with a clear pulse prior to the actual transfer of new information thereto from the input register.

FIGURES 3 and 5 are exploded diagrammatic views of two different types of thin magnetic film logical gates which may be employed in the present invention. Referring first to FIGURE 3, each gate includes a thin circular film of magnetic material deposited upon a glass substrate (not shown) in the manner disclosed in the United States patent to Rubens, 2,900,282. These films are approximately 0.05 inch in diameter, about 2500 A. thick, and may be spaced ten to the inch. The film is preferably of the uniaxial anisotropic type which has a single preferred axis of magnetization along which lies any remanent magnetization in either one of two opposite directions. This preferred axis of magnetization is shown by the dot-dash line in FIGURE 3 labelled P.M.A., and is often called the "easy axis" of the film. During application of one or more large external magnetic fields to the thin film, the magnetization of the film lies in the direction of the field or of the resultant field. Upon termination of the external field, the remanent magnetization of the film reverts to one of two opposite directions along the easy axis, instead of in the direction of the last applied field. The particular direction of the remanent magnetization along the easy axis depends upon several conditions, one of which is the smallest angle through which the magnetization need be turned after termination of the external field.

As shown in FIGURE 3, the digit winding, transfer winding, and sense winding are superimposed one upon another (with insulation therebetween) and upon the thin magnetic film included within each logical gate. These windings cross over the film element at an angle of approximately seventy degrees from the film easy axis. This angular displacement causes a small transverse field component which decreases the switching time of the film. The film is considered to be switched when its magnetization is reversed in direction during which time a change occurs in the net flux linking the sense winding so that a voltage is induced therein.

A second array of films may be placed on top of the sense winding etched circuit, with each film of this second array being directly over the corresponding film of the logical array. This second film array provides a partially closed flux path at each bit location and thereby reduces demagnetizing fields on the lower film elements. However, other means to complete this flux path may be utilized such as chunks of soft iron or ferrite materials placed on the winding array above a film element.

FIGURE 4 shows vector diagrams illustrating generally the orientation and relative magnitudes of the external magnetic fields acting upon the thin film, as well as the direction of flux in the thin film. In general, during quiescent conditions, i.e., when neither a digit pulse nor a transfer pulse is applied to the digit and transfer windings, the steady state bias current in the transfer winding of a gate creates a field $H_B$, shown in FIGURE 4*a*, which is normal to the axis of the transfer winding to create a flux of value $B_1$ in the direction shown in FIGURE 4*b*. Since all of the winding axes are approximately seventy degrees from the film easy axis, it is seen that the flux $B_1$ is not exactly parallel to the P.M.A. The field $H_B$ may therefore be resolved into a component lying along the film easy axis and into a component lying at right angles thereto.

The directions of the digit current and the transfer current in the respective digit and transfer windings of a film gate are such as to generate external fields which oppose the field $H_B$. For example, the digit current generates the field $H_D$ (only when a binary 1 is stored in the sampled input register stage), while the transfer current generates an external field $H_T$ as shown in FIGURE 4*a*. The transfer pulse or the digit pulse alone is not large enough to switch a film. However, if both pulses simultaneously are applied to the transfer and digit windings of a film, the magnetization of the film reverses in direction and induces a signal on the sense winding adjacent thereto. When these two pulses are removed, the bias current restores the magnetization in the film to its original direction as indicated by flux $B_1$. For example, the digit current generated by a digit driver is calculated such that the external field $H_D$ produced thereby cancels out the external field $H_B$ produced by the bias current in the transfer winding. If only the digit current is present, then the total net external field influencing the thin film is zero, and the only flux remaining in the thin film is the remanent flux indicated by $B_2$ in FIGURE 4*b*. This remanent flux lies along the easy axis of the film in the direction shown in FIGURE 4*b*. Although this operation involves a slight change in the net flux linking the sense winding, such change is not sufficient to induce a signal great enough to be amplified and strobed by the output sense amplifier. In like fashion, the presence of only the transfer current in the transfer winding effectively cancels the bias current therein to result in a zero net field, such that the remanent magnetization therein also appears as shown by $B_2$. On the other hand, when both the digit current and transfer current are present, the two fields $H_D$ and $H_T$ respectively produced by these currents sum together and produce a field in the thin film which is substantially larger than and opposite in direction to that shown by vector $H_B$. In this event, the magnetization in the thin film is rotated approximately 180 degrees to the position indicated by the vector labeled $B_3$ in FIGURE 4*b*. This large change in flux linking the sense winding causes a large induced voltage therein which is amplified and strobed by the sense amplifier for use in setting the associated stage of the output register to a condition indicating a binary 1. Upon termination of both the digit and transfer currents, the field $H_B$ due to the steady state bias current again returns the magnetization in the film to the direction indicated by vector $B_1$. This, therefore, prepares the film for any subsequent transfer operation to be performed.

FIGURE 5 shows a slightly different thin film logical gate which may also be utilized in the present invention. This gate requires two films 140 and 141 superimposed, but insulated from, one upon another. This construction is termed a "bicore" configuration. The film 140 is normally composed of a Co-Fe alloy, while film 141 is composed of a Ni-Fe alloy, both compositions being such that the films are nearly non-magnetostrictive. The transfer winding of the gate may be placed adjacent the upper film 140 as shown in FIGURE 5, while the digit and sense windings of the gate are placed adjacent the lower film 141. The easy axis of the films are parallel to each other, with the axis of the transfer, digit, and sense windings being approximately at an angle of 70 degrees with these easy axes.

Film 141, sometimes referred to as readout film, is inductively associated with film 140, sometimes referred to as the storage or memory film, such that any remanent magnetization existing in the latter produces a magnetic field external thereto which influences the degree and direction of the magnetization in film 141. It might be added here that film 139 in FIGURE 3 also can be called a readout film since a change of flux therein is detected by the sense winding output of the matrix. In the logic gate of FIGURE 5, the direction of the remanant magnetization in film 140 is determined by the direction of a transfer current applied to the transfer winding at a time prior to application of a digit current to the digit winding. The transfer current switches the magnetization in film 140 to lie along one direction of the easy axis. Thereafter, this remanent magnetization in film 140 biases the magnetization in film 141 to lie along its easy axis in the same direction. A digit current in the digit winding is now applied with a direction and of such magnitude to switch the magnetization in film 141 to the opposite direction, thus causing a change in the external flux linking the sense winding and so inducing a voltage therein.

This operation is depicted in FIGURE 6 which shows the orientation of the external magnetic fields and the direction of flux existing in films 140 and 141. For example, assume that a transfer current is initially applied to the transfer winding of the gate in a direction such that an external field $H_T$ is produced as shown in FIGURE 6*a*. This external field $H_T$ causes the magnetization in film 140 to have a direction parallel thereto, but after the transfer current disappears, the remanent magnetization in film 140 turns through the smaller angle to lie along the easy axis in the direction indicated by $B_S$ in FIGURE 6*b*. This remanent magnetization $B_S$ in film 140 also produces an external field which biases the magnetization in film 141 to lie along its easy axis in the direction indicated by the vector labeled $B_{R1}$ in FIGURE 6*b*. Thus, the logical gate is now conditioned to pass a binary 1 bit from the input register stage as indicated by a subsequently applied digit current pulse in the digit winding of the gate. For example, if a current pulse is now produced in the digit winding having a direction as indicated in FIGURE 5 (this current pulse only produced if a binary 1 is stored in the output register stage), then the external field generated by this digit current is in the direction indicated by the vector labeled $H_D$ in FIGURE 6*a*. This field has sufficient magnitude to switch the magnetization in film 141 from the direction indicated by vector $B_{R1}$ to the direction indicated by vector $B_{R2}$. However, the field produced by the digit current normally will not affect the direction of the remanent magnetization in film 140, inasmuch as this consists of material having a higher coercitivity. The sense winding of the gate, being inductively coupled with film 141, detects the change in flux in film 141 which thereupon induces a signal used to set the corresponding stage of the output register.

The operation of the transfer matrix in FIGURE 1 will now be described. Assume first that the magnetic thin film logical gate utilized is that shown in FIGURE 3, where both digit and transfer pulses should be applied simultaneously in order to effect the transfer. If it is desired to transfer the contents of register B to register 1, then a gate signal is applied to conductor 61 while the signal B To 1 is simultaneously applied to the transfer driver 72. Digit driver circuits 53 through 56 are simultaneously energized and digit currents produced in those conductors 41 through 44 which are associated with register B stages containing binary 1's. Transfer conductor 63 has produced therein a transfer current which flows through the transfer windings of gates 13 through 16 simultaneously with the flow of digit current in appropriate ones of the gate digit windings. Where a simultaneous flow of current occurs in both the transfer and digit windings of any of these gates, then a voltage will be induced in the associated sense winding which is applied by the appropriate one of the sense conductors 80 through 83 to the sense amplifiers 92 through 95. Therefore, corresponding stages in register 1 will be set with binary 1's.

If the transfer matrix of FIGURE 1 utilizes the logical gate disclosed in FIGURE 5, then the operation is modified as follows. Initially, the transfer pulse B to 1 is applied to transfer driver 72 in order to switch the remanent magnetization of film 140 in each of the gates 13 through 16. Thereafter, the gate signal applied via conductor 61 causes a current flow in the digit conductors 41 through 44 if a binary 1 is stored in the associated register stage. In those gates 13 through 16 having a current in their digit windings, the flux in the second film 141 is reversed, thus inducing a voltage in the output sense winding. However, where a gate 13 through 16 has no digit current in its digit winding, there is no reversal of flux direction in its film 141, so that no voltage is induced in its sense winding and thus the associated register stage of register 1 remains clear. In all other groups of gates in the transfer matrix, the absence of a current in their associated transfer windings prevents the film 140 of a gate from being switched to the conditioned state. Therefore, the magnetization of film 141 is essentially in the direction indicated by vector $B_{R2}$ of FIGURE 6*b*, so that a subsequent digit current in a digit winding reinforces this flux direction and thus fails to switch the film 141. Only that group of gates which had previously been conditioned by transfer current will be conditioned to pass binary 1's.

For ease of description, FIGURE 1 shows three input and three output registers with four bits per register. The same principle can be used with smaller or larger words, or with more words. The transfer matrix in FIGURE 1 might be described as a square matrix, wherein input and output registers are equal in number. However, the square matrix is not a requirement, and the number of inputs and outputs can be any value. For example, there might be six output registers with three input registers. Furthermore, by applying two or more signals to two or more transfer drivers at one time, two or more input registers may be simultaneously transferred each to a different one of the output registers. For example, application of a signal A To 3 and B To 1 at the same time will allow transfer of register A to register 3, and of register B to register 1. On the other hand, register A might be transferred to two output registers by a simultaneous application of the signals A To 3 and A To 2. Therefore, the transfer matrix of FIGURE 1 may be utilized in variety of operating modes depending upon the environment in which it is placed. It is also evident that the transfer, digit and sense windings of the gates can be connected in parallel with their associated input and output conductors, instead of in series as shown.

FIGURES 7 and 8 disclose other variations of the present invention. FIGURE 7 shows a simplified block diagram of a transfer matrix in which the number of bits stored by each register may vary. Registers A and 2, for example, hold three bit words while registers B, C, 1, and 3 hold four bit words. Each of the blocks 110 through 118 represents a group of magnetic thin film logical gates such as shown in either FIGURE 3 or FIGURE 5. Each group has a transfer conductor individual thereto to which is applied a transfer signal, e.g., A To 1, A To 2, etc. This transfer conductor in series circuit with the transfer windings of the gates in its associated group in the same manner as shown in FIGURE 1. Furthermore, a digit conductor is associated with each stage of the input registers and is connected in series circuit with the digit windings of logical gates one in each of the groups in the associated set. For example, there are three digit conductors associated with register A, each of which is connected in series circuit with the digit winding of a gate in each one of the groups 110, 111, and 112. Since there are only three digit conductors in this particular set of gates, there need be only three gates in each of the groups 110, 111, 112. Input register B, on the other hand, has four digit conductors associated therewith, each being connected in series circuit with a respective logical gate in each of the groups 113 and 115 which in turn are utilized to transfer the contents of register B into either register 1 or register 3. Therefore, these two groups each comprises four logical gates. However, group 114 is associated with output register 2 which is capable of only three bit storage. Therefore, only three gates need be included in group 114, and only three of the digit conductors associated with register B need be connected in series with the three gates in this group. FIGURE 7 illustrates this connection by showing one of the digit conductors bypassing group 114. The same situation prevails as regards group 117 in the set of gates associated with input register C. FIGURE 7 illustrates the case where $K_{nm}$ (i.e., the number of gates in a *m*th group of a *n*th set) varies according to the set and group location.

Sense windings of groups in different sets are connected in series circuit with the sense output conductors which in turn feed into respective ones of the output registers. The output from group 112 shows but three sense windings which are respectively connected in series circuit with individual sense windings of three gates located in group 115. However, group 115 actually contains four logical gates since it is required to transfer four bits of register B into the four bit register 3. FIGURE 7*a* shows the details of such a block as 115 which illustrates that only three gates therein are associated with the gates in block 112, whereas four sense windings are indicated as being the output therefrom due to the presence of four gates in group 115.

In operation, the transfer of any one of the input registers to any one of the output registers is accomplished by applying a transfer signal to the transfer conductor of the appropriate group in the transfer matrix. This operation is similar to that explained in connection with FIGURE 1. A transfer of information from register A to register 1 results in only three stages of register 1 being affected, since there are only three stages in input register A. The fourth stage always remains clear. Conversely, a transfer from register B to register 2 results in one of the bits from register B being lost.

FIGURE 8 shows a third variation of the present invention wherein a single set of registers is used as both input and output. This matrix allows any register in the set to communicate with any other register in the same set. In the case of FIGURE 8, a reduction in the number of groups of gates is obtained since it is not necessary to provide a group for transferring the output of a register to its input. For example, no group of gates is required for a transfer A to A. Groups 120 and 121 are utilized to transfer the contents of register A to either of the registers B or C. In like fashion, the remaining groups of gates 122 through 125 accomplish the transfers indicated by the labeling of the transfer signal applied to their individual transfer conductors. The arrangement of gates in each group, and the series connection of their transfer and digit windings is believed to be obvious in view of the previous descriptions.

In any of the transfer matrices shown in FIGURES 1, 7, or 8, a different connotation may be placed on the bits held in the input and output registers. For examples, the input registers of FIGURE 1 can be considered to be three 4-bit sections of a single 12-bit register holding a single 12-bit word. In this situation, a 4-bit portion can be removed from the single input word and transferred to one section of a single output register having twelve stages. Such a 4-bit portion need not be transferred to the output register in the same binary order position occupied by it in the input register, but instead can be scrambled. For example, four bits from the highest binary orders of the input register can be placed in the lowest binary orders of the output register. Furthermore, in any of the transfer matrices shown or described, the bits of a word may be scrambled out of order by connecting the output sense conductors to different ones of the sense amplifiers, or the like. Thus, it is apparent that a great many specific transfer matrices employing the principles of the present invention can be designed for many different environments. Therefore, many modifications may be made to the described and illustrated embodiments without departing from the principles of the invention as defined in the appended claims.

I claim:

1. A transfer matrix comprising: a plurality of thin magnetic film logical gates divided into N sets, where N is greater than one, with each *n*th set divided into M groups, where M is greater than one and at least equal to $N-1$, of $K_{nm}$ logical gates each, where each said logical gate includes a bistable thin magnetic readout film of the single preferred magnetic axis type together with means individual thereto and inductively coupled therewith capable of generating a changeable magnetic field for selectively biasing said readout film to either one of two flux conditions, with each said logical gate further including a digit winding and a sense winding both inductively coupled with said readout film so that a predetermined current in said digit winding can alter only a particular predetermined one of said two readout film flux conditions to an extent such that an output signal is induced on said sense winding; a number of $M \cdot N$ transfer means, each individual to and connected with the magnetic field generating means of every logical gate in a respectively different group and actuable independently of any other transfer means to cause each said magnetic field generating means connected therewith to bias its associated readout film to at least one of said two flux conditions; N different series of digit conductors, with one series for each *n*th set and with each digit conductor thereof being indivdual to and connected with the digit winding of a single gate in every group of the *n*th set but in a manner such that the digit winding of each gate in the matrix is connected with only one digit conductor, N input means each connected with a different said series for selectively and independently supplying to each digit conductor therein an input signal for creating said predetermined current in all of the digit windings to which it is connected; a plurality of sense conductors, each individual to and connected with the sense winding of a single gate of but one group in each of at least two said sets but in a manner such that the sense winding of each gate in the matrix is connected with only one sense conductor, with each sense conductor being adapted to transmit an output signal induced in any of the sense windings to which it is connected and at least N output means, each connected with different sense conductors such that any output signals supplied to any one of said output means are indicative of input signals from one of said input means.

2. A transfer matrix according to claim 1 wherein each value $K_{nm}$ is greater than one.

3. A transfer matrix according to claim 1 wherein the value $K_{nm}$ may vary according to the set and group.

4. A transfer matrix according to claim 1 wherein all values $K_{nm}$ are equal.

5. A transfer matrix according to claim 1 wherein each said input means includes first information bit storage stages each having an output terminal operatively connected to a different digit conductor for applying a said input signal thereto when said first storage stage contains a predetermined bit value, and each said output means includes second storage stages each having an input terminal operatively connected to a different said sense conductor responsive to a said output signal thereon for storing a predetermined bit value in said second storage stage.

6. A transfer matrix according to claim 1 wherein the number of said sense conductors is equal to the number of said digit conductors.

7. A transfer matrix according to claim 6 wherein each said input means includes information bit storage stages each having an output terminal operatively connected to a different digit conductor for applying a said input signal thereto when said storage stage contains a predetermined bit value, and each said output means also includes said information bit storage stages each further having an input terminal operatively connected to a different said sense conductor and responsive to a said output signal thereon for storing a predetermined bit value in said storage stage.

8. A transfer matrix according to claim 6 wherein each said input means includes information bit storage stages each having an output terminal operatively connected to a different said digit conductor for applying a said input signal thereto when said storage stage contains a predetermined bit value, and each said output means also includes said information bit storage stages each further having an input terminal operatively connected to a different said sense conductor and responsive to a said output signal thereon for storing a predetermined bit value in said storage stage.

9. A transfer matrix according to claim 1 wherein said magnetic field generating means of each logical gate comprises at least a current carrying transfer winding connected with a said transfer means by means of a transfer conductor which in turn is common only to all of the gates in the same group.

10. A transfer matrix according to claim 9 wherein the said transfer winding of each gate is inductively coupled with its associated readout film, and each said transfer means creates in each transfer winding to which it is connected a first current condition when actuated for biasing the associated readout film to one of said two flux conditions, and a second current condition when unactuated for tending to bias the readout film to the other of said two flux conditions.

11. A transfer matrix according to claim 9 wherein as part of the magnetic field generating means of each said logical gate the transfer winding therefor is inductively coupled with a bistable thin magnetic memory film of the single preferred magnetic axis type which in turn is inductively coupled with the said readout film for biasing the latter to either one of said two flux conditions.

12. A transfer matrix according to claim 9 wherein each said digit conductor and its associated digit windings are all connected in series circuit, each said sense conductor and its associated sense windings are all connected in series circuit, and each said transfer conductor and its associated transfer windings are all connected in series circuit.

13. A transfer matrix comprising, a plurality of thin magnetic film logical gate divided into N sets, where N is greater than one, with each *n*th set divided into M groups, where M is greater than one, of $K_{nm}$ logical gates each, where each said logical gate includes a bistable thin magnetic readout film of the single preferred magnetic axis type together with means individual thereto and inductively coupled therewith capable of generating a changeable magnetic field for selectively biasing said readout film to either one of two flux conditions, with each said logical gate further including a digit winding and a sense winding both inductively coupled with said readout film so that a predetermined current in said digit winding can alter only a particular predetermined one of said two readout film flux conditions to an extent such that an output signal is induced on said sense winding; a number of $M \cdot N$ transfer means, each individual to and connected with the magnetic field generating means of every logical gate in a respectively different group and actuable indpendently of any other transfer means to cause each said magnetic field generating means connected therewith to bias its associated readout film to at least one of said two flux conditions; N different series of digit conductors, with one series for each *n*th set and with each digit conductor thereof being individual to and connected with the digit winding means of a single gate in every group of the *n*th set but in a manner such that the digit winding of each gate in the matrix is connected with only one digit conductor, N input means each connected with a different said series for selectively and independently supplying to each digit conductor therein an input signal for creating said predetermined current in all of the digit windings to which it is connected; a plurality of sense conductors, each individual to and connected with the sense winding means of a single gate of but one group in each of said sets but in a manner such that the sense winding of each gate in the matrix is connected with only one sense conductor, with each sense conductor being adapted to transmit an output signal induced in any of the sense windings to which it is connected and at least N output means, each connected with different sense conductors such that any output signals supplied to any one of said output means are indicative of input signals from one of said input means.

14. A transfer matrix according to claim 13 wherein all values $K_{nm}$ are equal.

15. A transfer matrix according to claim 13 wherein the value $K_{nm}$ may vary according to the set and group.

16. A transfer matrix according to claim 13 wherein each value $K_{nm}$ is greater than one.

17. A transfer matrix according to claim 13 wherein said magnetic field generating means of each logical gate comprises at least a current carrying transfer winding connected with a said transfer means by means of a transfer conductor which in turn is common only to all of the gates in the same group.

18. A transfer matrix according to claim 13 wherein the number of said sense conductors is equal to the number of said digit conductors.

19. A transfer matrix according to claim 13 wherein N equals M.

20. A transfer matrix according to claim 17 wherein the said transfer winding of each gate is inductively coupled with its associated readout film, and each said transfer means creates in each transfer winding to which it is connected a first current condition when actuated for biasing the associated readout film to one of said two flux conditions, and a second current condition when unactuated for tending to bias the readout film to the other of said two flux conditions.

21. A transfer matrix according to claim 17 wherein as part of the magnetic field generating means of each said logical gate the transfer winding therefor is inductively coupled with a bistable thin magnetic memory film of the single preferred magnetic axis type which in turn is inductively coupled with the said readout film for biasing the latter to either one of said two flux conditions.

22. A transfer matrix according to claim 17 wherein each said digit conductor and its associated digit windings are all connected in series circuits, each said sense conductor and its associated sense windings are all connected in series circuit, and each said transfer conductor and its associated transfer windings are all connected in series circuit.

23. A transfer matrix comprising: a plurality of thin magnetic film logical gates divided into N sets, where N is greater than two, with each *n*th set divided into $N-1$ groups of K logical gates each, where each said logical gate includes a bistable thin magnetic readout film of the single preferred magnetic axis type together with means individual thereto and inductively coupled therewith capable of generating a changeable magnetic field for selectively biasing said readout film to either one of two flux conditions, with each said logical gate further including a digit winding and a sense winding both inductively coupled with said readout film so that a predetermined current in said digit winding can alter only a particular predetermined one of said two readout film flux conditions to an extent such that an output signal is induced on said sense winding; a number of $M \cdot N$ transfer means, each individual to and connected with the magnetic field generating means of every logical gate in a respectively different group and actuable independently of any other transfer means to cause each said magnetic field generating means connected therewith to bias its associated readout film to at least one of said two flux conditions; N different series of digit conductors, with one series for each *n*th set and with each digit conductor thereof being individual to and connected with the digit winding of a single gate in every group of the *n*th set but in a manner such that the digit winding of each gate in the matrix is connected with only one digit conductor, N input means each connected with a different said series for selectively and independently supplying to each digit conductor therein an input signal for creating said predetermined current in all of the digit windings to which it is connected; a plurality of sense conductors, each individual to and connected with the sense winding of a single gate of but one group in each of $N-1$ sets but in a manner such that the sense winding of each gate in the matrix is connected with only one sense conductor, with each sense conductor being adapted to transmit an output signal induced in any of the sense windings to which it is connected and at least N output means, each connected with different sense conductors such that any output signals supplied to any one of said output means are indicative of input signals from one of said input means.

References Cited by the Examiner

UNITED STATES PATENTS

| | | | |
|---|---|---|---|
| 2,960,682 | 11/60 | French | 340—166 |
| 3,011,165 | 11/61 | Angel | 340—347 |
| 3,015,809 | 2/62 | Myers | 340—174 |
| 3,030,612 | 4/62 | Rubens | 340—174 |
| 3,048,829 | 8/62 | Bradley | 340—174 |
| 3,054,988 | 9/62 | Edwards | 340—172.5 |
| 3,069,086 | 12/62 | Papo | 340—174 X |
| 3,069,658 | 12/62 | Kramskoy | 340—174 X |
| 3,159,821 | 12/64 | Rossing | 340—174 |

NEIL C. READ, *Primary Examiner.*

IRVING L. SRAGOW, *Examiner.*